Patented July 27, 1954

2,684,982

UNITED STATES PATENT OFFICE 2,684,982

RECOVERY OF LEVULINIC ACID

Andrew P. Dunlop, Riverside, Ill., assignor to The Quaker Oats Company, Chicago, Ill., a corporation of New Jersey No Drawing. Application November 19, 1951,
Serial No. 257,177

6 Claims. (Cl. 260—526)

This invention relates to the recovery and purification of levulinic acid and more particularly to the extraction of levulinic acid from aqueous mixtures containing the same.

In the production of levulinic acid by the treatment of carbohydrate materials with an aqueous solution of a mineral acid such as dilute sulfuric acid, a mixture of products is obtained including insoluble humus materials, levulinic acid, formic acid, and colored products. Various methods have been proposed for recovering levulinic acid in a pure state from such mixtures. Generally the insoluble materials are first removed by filtration and then the levulinic acid is recovered in a more or less pure state from the filtrate by extraction with a solvent. Specific solvents employed in the prior art include diethyl ether, normal butyl alcohol and methylene chloride. Since each of these solvents possess certain disadvantages, the results obtained using these solvents have not been entirely satisfactory. For example, the distribution of levulinic acid between ether and water is unfavorable which means that a very large amount of ether must be used to secure practical recoveries of acid. In addition, ether is very volatile and highly inflammable, making it a distinct fire hazard. Although methylene chloride is not inflammable and its distribution coefficient is about one and one-half times as great as in the case of ether, it is very volatile and toxic making it an industrial hazard. Normal butyl alcohol extracts a certain amount of colored materials and mineral acid along with levulinic acid making a second purification step necessary for the recovery of useable levulinic acid.

It is, therefore, an object of the present invention to provide an improved method of purifying levulinic acid and particularly of recovering levulinic acid from reaction mixtures and the like containing impure levulinic acid which obviates the disadvantages of the prior art methods for recovering levulinic acid that is simple and effective. It is yet another object of my invention to provide a method for recovering levulinic acid from crude aqueous solutions of the same obtained by the treatment of carbohydrate materials with dilute aqueous solutions of mineral acids which method eliminates the necessity of removing insoluble humus materials prior to extraction. It is a further object of the present invention to provide an improved method of recovering levulinic acid from crude mixtures which method involves the use of a solvent that is a good solvent for levulinic acid. These and still further objects will be obvious from the ensuing description of the invention.

The foregoing objects are accomplished in accordance with the present invention by extracting aqueous mixtures of crude levulinic acid with furfural. I have discovered that furfural is an excellent solvent for this purpose in that it is selective in its action and that its ability to extract levulinic acid from aqueous solutions or mixtures is much greater than the solvents mentioned in the prior art. As compared to diethyl ether and methylene chloride the distribution coefficient of furfural is about 3¾ and 2½ times as great, respectively, as for the solvents mentioned.

One method of practicing the present invention is to subject crude levulinic acid mixtures to extraction with furfural. If desired the insoluble humus materials may be removed from the mixture by filtration prior to extraction. Such a procedure, however, is not essential for the efficient operation of the process as the levulinic acid can be recovered from crude mixtures containing such insoluble materials with equal facility. Extraction may be carried out either as a batch or as a continuous method of operation. If the former method is employed about 1 part by volume of crude aqueous levulinic acid is extracted with an equal volume of furfural. The furfural layer is removed, the aqueous layer is extracted with fresh furfural and the process continued until the levulinic acid has been removed as completely as is considered practical from the aqueous solution. After extraction has been completed, the levulinic acid may be recovered from the furfural in a relatively pure form by distilling off the furfural so as to leave a residue of the recovered acid. If the continuous method of operation is employed, the furfural, being heavier than water or an aqueous levulinic acid solution, is allowed to flow downward against an ascending stream of the aqueous mixture containing the levulinic acid. I have found that by the use of an efficient extractor and using about 1¼ times as much furfural as aqueous levulinic acid by volume, it is possible to remove all but about 0.1% of the levulinic acid from the aqueous layer. The furfural thus discharged from the extractor may contain from 5% to 20% levulinic acid, depending upon the initial concentration of the aqueous solution subject to extraction and the volume of furfural used compared to the volume of aqueous acid extracted. It is, of course, necessary to use the liquid-liquid extractor in such a way that a lower furfural phase and an upper aqueous phase are present thus permitting the withdrawal of the furfural layer free of occuluated water from the base of the column and the withdrawal of the aqueous layer free of occluded furfural from the top of the column. The levulinic acid may be recovered from the furfural layer as in the batch process by distilling off the furfural, leaving a residue of the recovered acid. The recovered acid so obtained by either process is substantially free from colored materials and other impurities. If an especially pure product is desired, the levulinic acid may be further purified by recrystallization or by vacuum distillation.

Aside from the advantages indicated above which result from the use of furfural for the present purpose it should be mentioned that under the conditions employed furfural is less hazardous than other solvents suggested as regards inflammability and toxicity. Also in view of the large difference between the boiling points of formic acid, furfural and levulinic acid, it is obvious that the separation of each of these constituents from the other two can be easily accomplished by distillation.

As the foregoing description is illustrative only, not restrictive in scope, it is to be understood that many different embodiments of the present invention may be practiced without departing from the spirit and scope thereof, except as is limited by the following claims.

I claim:

1. A process for recovering levulinic acid from an aqueous solution which comprises extracting said aqueous solution with furfural.

2. A process for recovering levulinic acid from an aqueous solution which comprises subjecting said aqueous solution to a counter-current flow of furfural in an extractor.

3. In a process for recovering levulinic acid from a crude aqueous solution obtained by heating a carbohydrate material with a mineral acid, said solution containing insoluble humus materials suspended therein, color bodies, and mineral acid as impurities, the step which comprises selectively extracting levulinic acid from said aqueous mixture with furfural.

4. In a process for recovering levulinic acid from a crude aqueous solution obtained by heating a carbohydrate material with a mineral acid, said solution containing insoluble humus materials suspended therein, color bodies, and mineral acid as impurities, the step which comprises selectively extracting levulinic acid from said aqueous mixture with furfural, and separating substantially pure levulinic acid from the resulting furfural solution of levulinic acid.

5. A process for recovering levulinic acid from an aqueous solution which includes intimately contacting said aqueous levulinic acid solution with furfural allowing the mixture to separate into a lower layer composed of levulinic acid dissolved in furfural and an upper layer composed of water, dissolved color bodies, and mineral acid and separating said furfural layer from said water layer.

6. A process for recovering levulinic acid from an aqueous solution which includes intimately contacting said levulinic acid solution with furfural, allowing the mixture to separate into a lower layer composed of levulinic acid dissolved in furfural and an upper layer composed of water, dissolved color bodies, and mineral acid and then removing the furfural from the separated lower layer whereby to obtain a light colored levulinic acid suitable for commercial use.

References Cited in the file of this patent

UNITED STATES PATENTS

| Number | Name | Date |
|---|---|---|
| 1,995,965 | Davidson et al. | Mar. 26, 1935 |
| 2,018,031 | Oxyley et al. | Oct. 22, 1935 |
| 2,165,438 | Allquist | July 11, 1939 |
| 2,255,235 | Wentworth | Sept. 9, 1941 |
| 2,257,389 | Macallum | Sept. 30, 1941 |

FOREIGN PATENTS

| Number | Country | Date |
|---|---|---|
| 208,747 | Switzerland | May 16, 1940 |
| 583,533 | Great Britain | Dec. 20, 1946 |